United States Patent
Said et al.

(10) Patent No.: US 9,621,673 B2
(45) Date of Patent: Apr. 11, 2017

(54) CUSTOMER INITIATED TENANT OPERATIONS IN A MULTITENANT CLOUD ENVIRONMENT

(71) Applicants: Bare Said, Walldorf (DE); Frank Jentsch, Muehlhausen (DE)

(72) Inventors: Bare Said, Walldorf (DE); Frank Jentsch, Muehlhausen (DE)

(73) Assignee: SAP SE, Walldorf (DE)

( * ) Notice: Subject to any disclaimer, the term of this patent is extended or adjusted under 35 U.S.C. 154(b) by 573 days.

(21) Appl. No.: 14/103,879

(22) Filed: Dec. 12, 2013

(65) Prior Publication Data

US 2015/0172367 A1   Jun. 18, 2015

(51) Int. Cl.
*H04L 29/08* (2006.01)

(52) U.S. Cl.
CPC .................. *H04L 67/306* (2013.01)

(58) Field of Classification Search
CPC ....... H04L 67/306; H04L 67/10; H04L 67/06; H04L 51/24; H04L 41/50; H04L 63/10; G06F 11/263; G06F 21/6281; G06Q 30/0207

See application file for complete search history.

(56) References Cited

U.S. PATENT DOCUMENTS

| | | |
|---|---|---|
| 7,680,825 B2 | 3/2010 | Becker |
| 7,689,593 B2 | 3/2010 | Becker |
| 7,693,851 B2 | 4/2010 | Becker |
| 7,698,284 B2 | 4/2010 | Becker et al. |
| 7,739,348 B2 | 6/2010 | Becker |
| 7,917,607 B2 | 3/2011 | Becker et al. |
| 7,933,869 B2 | 4/2011 | Becker et al. |
| 7,949,684 B2 | 5/2011 | Brooks et al. |
| 8,069,184 B2 | 11/2011 | Becker et al. |
| 8,112,445 B2 | 2/2012 | Weissman et al. |
| 8,195,743 B2 | 6/2012 | Janedittakarn et al. |
| 8,539,078 B2 | 9/2013 | Duan et al. |
| 8,700,745 B2 | 4/2014 | Dittrich |
| 2005/0283478 A1 | 12/2005 | Choi et al. |
| 2012/0179646 A1 | 7/2012 | Hinton et al. |
| 2013/0282761 A1* | 10/2013 | Tamm ............... G06F 17/30566 707/781 |
| 2015/0033365 A1* | 1/2015 | Mellor .................. H04L 63/102 726/29 |

* cited by examiner

*Primary Examiner* — Kim T Nguyen (57) ABSTRACT

Customer initiated tenant operations are presented that are provided within a work center of a client cloud application. System supported tenant operations combined with automatic validations and determinations are exposed directly to the customer via the work center. Customers are able to coordinate and initiate tenant operations using a specific work center called a service control center, which is added to other work centers that build the cloud enterprise applications or products the customers are using. The enterprise application embedded service control center is connected to a central service control center, which is located in a service provider cockpit system. The central service control center enables the execution of customer specific tenant operations that are tailored to the customer's landscape and guarantees the tenant isolation.

20 Claims, 5 Drawing Sheets

FRONTEND EMBEDDED SERVICE CONTROL CENTER 115

Systems

Show [Active Systems ▼] [Go]

Group By [None ▼] [View ▼] [Request Tenant Creation] — 210 [Request Termination]

| Status | System ID | System Type | System URL |
|---|---|---|---|
| ◁ Maintenance | 730021202 | Test | https/:qnq-cust997.dev.sapbydesign.com |
| ◁ Maintenance | 730021221 | Test | https/:qcn-cust999.dev.sapbydesign.com |
| ◁ Maintenance | 730021225 | Test | https/:qcn-cust999.dev.sapbydesign.com |
| ◁ Maintenance | 730021265 | Test | https/:qnq-cust002.dev.sapbydesign.com |
| ◁ Maintenance | 730021270 | Test | https/:qnq-cust005.dev.sapbydesign.com |
| ◁ Maintenance | 730021275 | Test | https/:qnq-cust997.dev.sapbydesign.com |
| ■ Running | 730021279 | Test | https/:hzj-cust205.dev.sapbydesign.com — 310 |
| ◁ Maintenance | 730021281 | Test | https/:a8m-cust800.dev.sapbydesign.com |
| ■ Running | | | 05.dev.sapbydesign.com |
| ■ Running | | | 05.dev.sapbydesign.com |

Create New Tenant 320   [🔧] [☐] [X]

Source Data for new Tenant 330

Data Source Selection: 340   [Data from Source Tenant]
Data Source Tenant ID: 350   [730021279]
BC Profile Source Tenant ID:   [         ]

[OK] [Cancel]

Details: System 730021279 – Test
Active From/To:    /
System URL:  https:/hzj-cust205.d
System ID:    730021279

CUSTOMER INITIATED TENANT OPERATIONS IN A MULTITENANT CLOUD ENVIRONMENT

BACKGROUND

In cloud environment, software products such as cloud-based applications can be provided as services. In various embodiments, one system may be used to host and run multiple applications or multiple instances of an application for one or more customers. One system may serve multiple customers. A customer can get a tenant on that system, isolated and secured from other tenants of other customers. On that tenant, the customer runs one or more applications in the cloud. In this scenario, the customer is not responsible for running, managing, updating, and so on the tenant. These processes are performed by the cloud provider.

A cloud platform enables a large number of computers to be connected through a real-time network such as the Internet. In this way, hosted application services that run on the cloud platform can be provisioned to run client server software on a remote location. End users may access the cloud-based applications through a Web browser, a thin client, a mobile application, etc., while the enterprise software and the users' data are stored on server nodes at a remote location. Cloud providers may install and operate application software in the cloud and cloud users access the software from cloud clients. Cloud users may not manage the cloud infrastructure and platform where the application runs. This would eliminate the need to install and run the application on the cloud user's own computers, which simplifies maintenance and support.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for methods and systems including customer initiated tenant operations in a multi-tenant cloud environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Typically, a cloud provider may provide one or more automated tenant processes defined by a Service Provider in the cloud environment. These tenant processes are pre-defined, rigid standardized processes optimized for low total cost of ownership (TCO). A predefined tenant process may be a chain of automated steps such as: making a change in a temporary test system by the customer, which change is then automatically implemented in a productive system and the temporary test system is closed. These statically pre-defined processes may not match customers' needs and requirements, especially large enterprise customers, who run hybrid solutions with a complex on-premise system landscape. The on-premise system landscape of a customer may include more than one system instances, for example, a productive system instance, a testing system instance, a consolidation system instance, etc. Thus, some ad hoc manual exception processes were created as a workaround. Those exception processes led to a big number of additional tenants that were created for customers. Additionally, they led also to high communication and interaction efforts with the customers and increased the intransparency due to manual or non-system supported requests and confirmation steps and also due to customer tenants that cannot be assigned to a predefined process.

In various embodiments, multiple tenants (system instances) are provided by the cloud provider to serve a customer in the cloud environment. In this way, the complex system landscape of the customer can be mirrored in the cloud environment including customer's different system instances (e.g., productive, consolidation, testing, etc.) and the connections between the system instances. The rigid predefined tenant processes are avoided; the cloud provider relies directly on a part of elementary tenant operations that are used in the predefined tenant processes. Basic tenant operations triggering mechanisms used in the predefined tenant processes are exposed by the service/software provider to the customer. In this way the customer may choose which basic tenant operation to execute. The tenant operations are exposed without providing them with direct access to the tenant and the system landscape management system (e.g., a service provider cockpit system).

Figure 1:
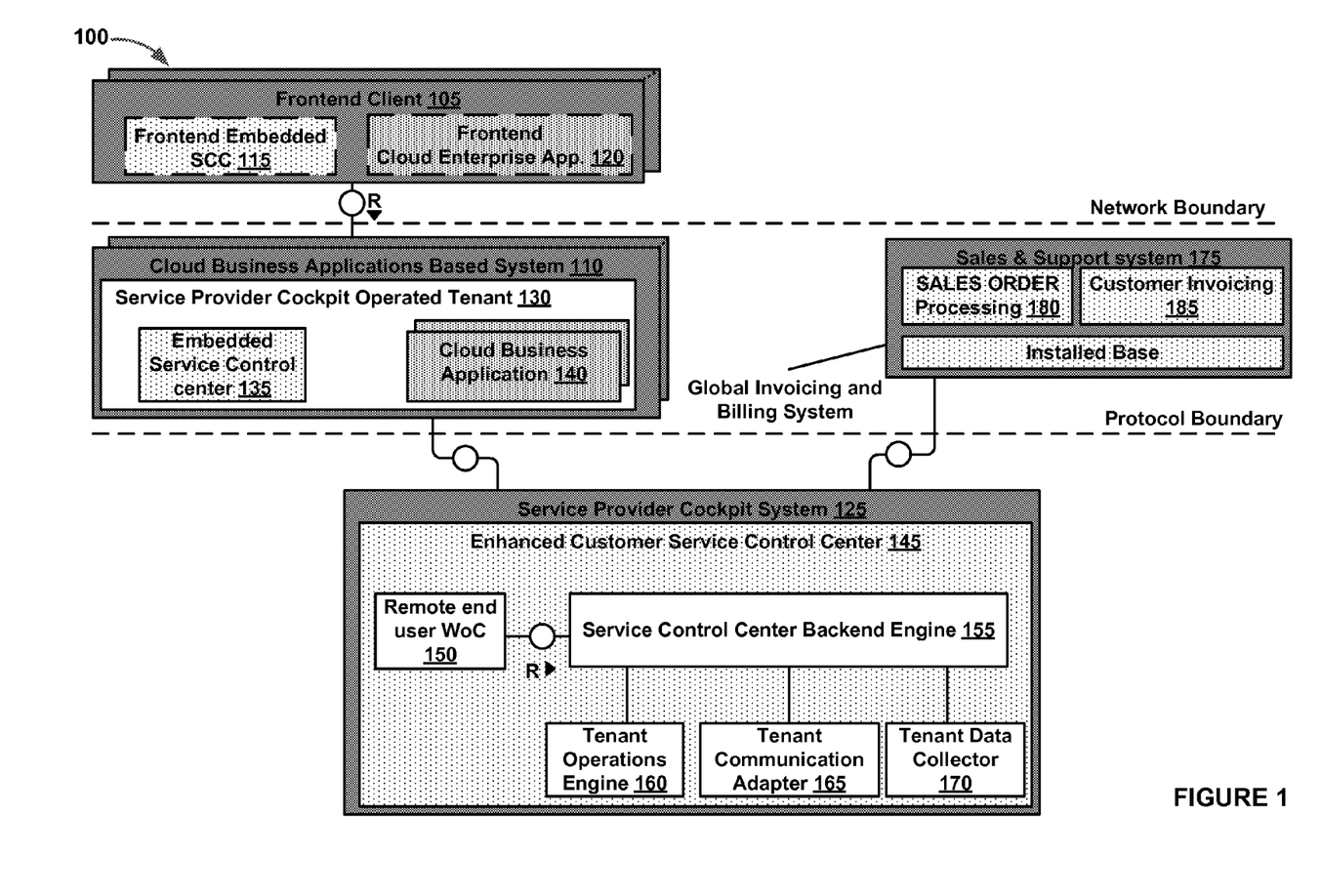
FIG. 1 is a block diagram illustrating an architectural overview of a computing system including customer initiated tenant operations in a multitenant cloud environment, according to some embodiments.

FIG. 1 is a block diagram illustrating an architectural overview of a computing system including customer initiated tenant operations in a multitenant cloud environment, according to some embodiments. System 100 may comprise a general-purpose computing system and may execute program code to perform one or more of the processes described herein. System 100 may include other not shown elements according to some embodiments.

Computing system 100 includes one or more frontend clients 105, e.g., running in one or more Web browsers and connected to cloud enterprise applications based system 110. Frontend client 105 includes a frontend embedded service control center (SCC) 115 and frontend cloud enterprise application 120. Frontend cloud enterprise application 120 is the frontend part (e.g., the user interfaces for managing the application) of the customer's enterprise application running on the cloud enterprise applications based system 110.

In various embodiments, a customer may coordinate and initiate tenant operations using a specific work center called "service control center". The service control center is added to other work centers that build the cloud enterprise applications or products they are using. The frontend client 105 includes a frontend embedded SCC 115 in the UIs that enables the user to maintain and manage tenant operations.

In various embodiments, cloud enterprise applications based system 110 is a system for cloud enterprise applications managed by the service provider cockpit (SPC) system 125. The cloud enterprise applications based system 110 includes one or more SPC operated tenants such as SPC operated tenant 130. The one or more SPC operated tenants may serve one or more customers. A customer may have more than one tenant. An SPC operated tenant represents a virtual system instance, a tenant, operated by the system landscape management system—the service provider cockpit system 125.

The SPC operated tenant 130 includes an embedded service control center 135 connected to a central service control center (such as enhanced customer service control center 140) that is located in the service provider cockpit system 125. The embedded service control center 135 is the backend side of the embedded service controller center, where the frontend embedded SCC 115 is the client side. Similarly, the embedded service control center 135 is a work center embedded in the cloud enterprise application 140 that enables a user such as an administrator to view and manage the work center data. Further, the SPC operated tenant 130 includes the backend side of the cloud enterprise application 140. The frontend side of the cloud enterprise application 120 is part of the frontend client 105.

In various embodiments, the SPC operated tenant 130 is connected to the service provider cockpit system 125. The embedded service control center 135 is connected to the enhanced customer service control center 145. The service provider cockpit system 125 provides various features such as network monitoring, data collection, tenant operations execution, and so on. The enhanced customer service control center 140 enables the execution of customer specific tenant operations that are tailored to the customer situation and guarantees the tenant isolation. Validations (e.g., checks) and determinations (e.g., subsequent steps) are triggered automatically based on the different customer related data such as customer contract data defined in a service level agreement (SLA) or service data, which may be located in different systems.

The enhanced customer service control center 145 capabilities are exposed to the customer by a set of user interfaces (e.g., a work center) that enables the customer to get an overview about his or her own available tenants and their operational status. In various embodiments, the service control center is enhanced to become the main and unique place to trigger and monitor customer initiated tenant and cross tenant operations. That means additionally to tenant monitoring operations, at least the following operations and features are implemented: 1) tenant decommissioning; 2) ordering a new customer tenant (there are different tenant types such as: a test tenant, a productive tenant, a validation tenant, etc.) 3) solution profile/work space transport across customer tenants; and 4) extensions transport across customer tenants.

Tenant decommissioning is a tenant operation provided with the customer's work center that enables a customer to create a decommissioning request for a tenant that is no longer needed. The customer can select one tenant from a list of customer tenants and then create a decommissioning request action. Pending decommissioning requests are visible to the customer as long as they are in progress. Once the tenant is removed, the decommissioning request will disappear. Therefore, the enhanced customer service control center 145 is also enhanced with an additional list comprising the tenant operation requests initiated by the customers and which of the tenant operation requests are still in process.

Ordering a new customer tenant is a tenant operation provided with the customer's work center that enables a customer to order an additional tenant. In various embodiments, the following information may be provided by the customer when a new tenant is ordered, respectively when a tenant provisioning request is created: 1) a business system type that specifies the type of the new system (e.g., a productive tenant, a test tenant, a validation tenant, and so on.); and 2) a source tenant for application data and a solution profile. If a new tenant is requested, the customer can specify to get an initial tenant (with no application data and with an initial solution profile) or to select one of the tenant available in the tenant list of the work center to be a source for obtaining application data and/or a solution profile. Source tenants for solution profiles and application data may differ and may not be the same.

Solution profile transport or work space transport across customer tenants is a tenant operation provided with the customer's work center that enables a customer to transport and deploy workspaces that comprise customer specific configuration and tenant setup related data from one tenant to another. This transport helps customers to manage and configure their tenants in case they have ordered more than one tenant to mirror their on-premise system landscape (e.g., a development tenant, a test tenant, an integration test tenant, etc.). The cross tenant transport may not be only on workspace level, but may also support a delta transport (this means that there is no need to transport the whole workspace with the complete system configuration, but only the changes performed to the existing workspace) so that a configuration change can be transported across customer tenants and deployed with respect to data consistency and tenant type. For example, deployment into a productive tenant may be more restrictive than deployment into a test tenant.

Extensions transport across customer tenants is a tenant operation provided with the customer's work center that enables a customer to increase the flexibility of tenant processes of the enhanced customer service control center 145 by offering the possibility to take over the extensions performed in one tenant to the other tenant. Similarly to the solution profile transport, the customer may trigger extensions transport across his or her tenants. A source tenant and a target tenant have to be specified. In various embodiments, the customer may start with a test system tenant and decide later to have a productive system tenant or another test system tenant. In these cases, the customer may transfer the extensions performed on the initial system to the subsequent system(s) via a tenant operation.

Referring back to FIG. 1, remote end user work center (WoC) 150 of enhanced customer service control center 145 receives the triggered actions as requests from the work center of the frontend client 105. The triggered actions represent the exposed tenant operations to the customer via the UIs of the work center. The request is forwarded to the service control center backend engine 155. The service control center backend engine 155 processes the request using a set of components including, but not limited to: tenant operations engine 160, tenant communication adapter 165, and tenant data collector 170.

Tenant operations engine 160 is responsible for execution of the tenant operations received from the frontend client 105 such as removing a tenant, adding a tenant, copying a solution profile, and so on. In various embodiments, a set of validation and determination rules may be implemented in the enhanced customer service control center 145 and executed by the tenant operations engine 160 to simplify the initiation of the tenant operations and enforce the consistency and transparency of the tenant processes, when those tenant operations are triggered. The implemented rules may be product-dependent. The rules may rely on data originated from different systems that are integrated with the landscape management system (e.g., sales possessing, invoicing, etc.)

Tenant communication adapter 165 is responsible for isolation of the different tenants. When a request from the frontend client 105 is received, the tenant communication adapter 165 determines from which tenant the request was sent, which data can be accessible from that particular tenant and that particular user. The tenant isolation guarantees that for a given tenant and a user, when a request is received, the correct data is returned to that tenant and the user sent the request. Some data may be restricted for given tenants and users.

Tenant data collector 170 is responsible for collecting and storing data from a customer's system. In various embodiments, the data may be collected from different systems including service provider operational systems. For example, data may be collected from sales & support system 175, which is a global invoicing and support system that keeps data from sales order processing 180 and customer invoicing 185, where customers' data is maintained. In some embodiments, when a customer requests an additional tenant, the service provider cockpit system 125 checks in sales & support system 175 if the customer has bought the option for such additional tenant. In other embodiments, the service provider cockpit system 125 may check the SLA data with the customer to allow the order of a new tenant (or some other operation). Some data may be collected form the managing system itself (e.g., the service provider cockpit system 125) such as usage of the system, location of the solution profiles, and so on. Thus, the tenant data collector 170 may store replicated customer data from the customer's system and from other systems such as the sales & support system 175. Further, the replicated customer's data is isolated in the tenant data collector 170.

In various embodiments, end-to-end tenant processes may be spread over several customer systems so that cross systems integration is necessary. Validations and determinations of tenant processes not only rely on data that are originated from the sales & support system 175, but they also generate data relevant for the sales & support system 175. Essential contract data, e.g., product data, a start date, specific SLAs, will be replicated to the service provider cockpit system 125. Based on this replicated data, appropriate validations and determinations for customer initiated tenant operation can be executed. When tenant operations are executed in the service provider cockpit system 125 that are related to specific invoicing and billing (extra chargeable operations such as ordering an additional test tenant), the sales & support system 175 will be informed via messages sent automatically via the service provider cockpit system 125.

Figure 2:
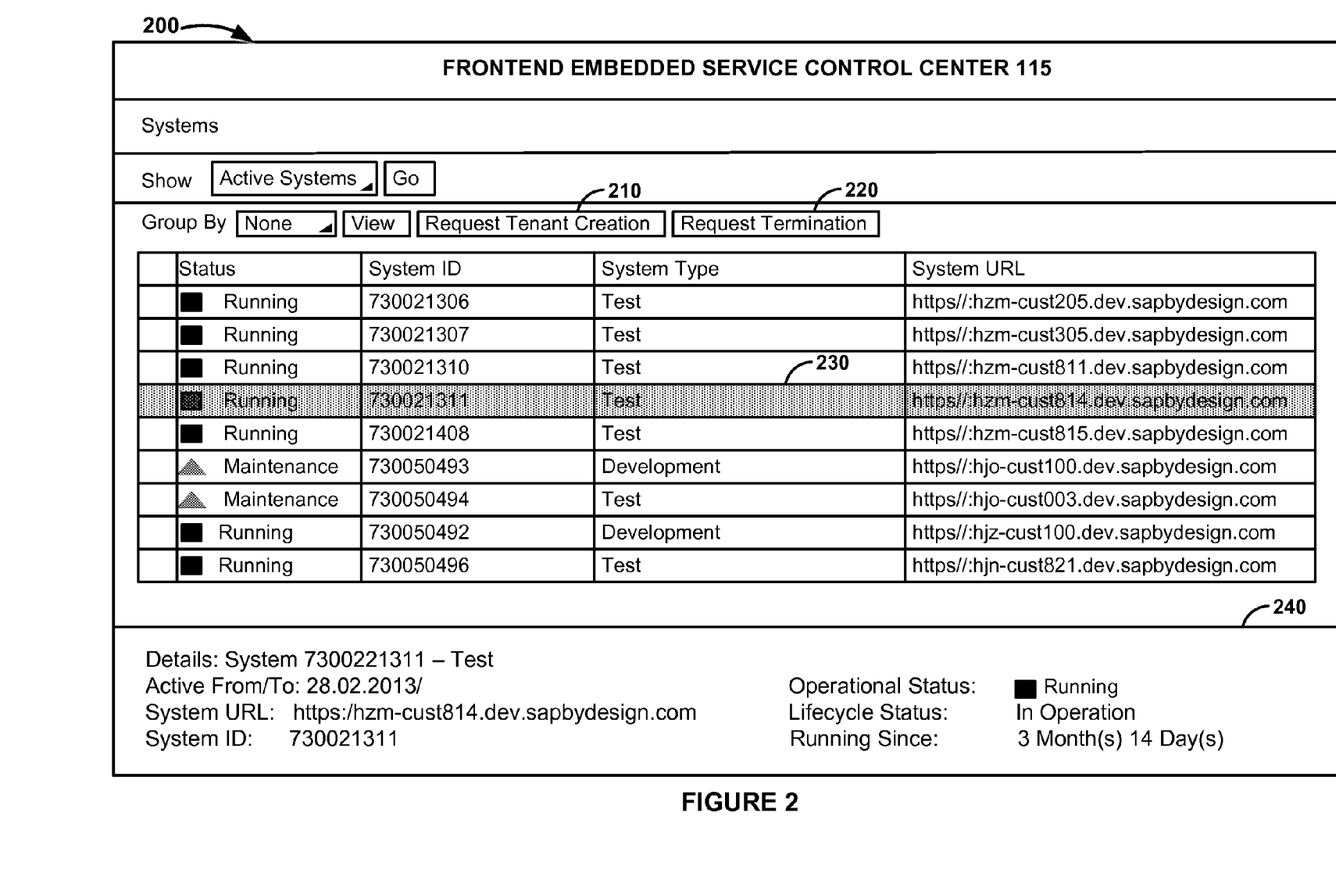
FIG. 2 is an exemplary screenshot illustrating features of a service control center, according to some embodiments.

FIG. 2 is an exemplary screenshot illustrating features of a service control center, according to some embodiments. Screenshot 200 may include other unshown elements according to some embodiments. Screenshot 200 illustrates a user interface from the frontend embedded service control center 115. Screenshot 200 illustrates available active customer systems as tenants. A customer system tenant is displayed with: 1) status (e.g., running, stopped, in maintenance, etc.); 2) system identifier (ID); 3) system type (specifies the type of the tenant: test, development, productive, consolidation, etc.); 4) system URL (the Web address to the tenant); and so on. The frontend embedded service control center 115 enables a user to perform a plurality of tenant operations such as Request Tenant Creation 210 or Request Termination 220 on a selected tenant. Further, when a tenant is selected by the user, such as tenant 230, detailed information 240 about the tenant is displayed in the UI.

Request Termination 220 option enables the user to create a decommissioning request for a particular selected tenant that is no longer needed. The user can select one tenant from the displayed list of customer tenants and then create the decommissioning request to remove the selected tenant. In various embodiments, data storage and recovery may be implemented in another module of the cloud platform that may store the customer data of the removed tenant for a given period of time. Although the customer has initiated a decommissioning request for a given tenant and the tenant is removed from the displayed tenants in the work center, for a given period of time (e.g., four weeks) this tenant is not removed from the system and the cloud platform; it is just not visible to the customer.

In some embodiments, after this period ends, the tenant and its data are backed up and archived. In this case, the customer can request and obtain the data from the removed tenant or restore the entire tenant from the archive. In other embodiments, after the initial period of time ends, the tenant and its data may be removed from the system. This may be a preferable option for test tenants that are no longer needed to the customer.

Figure 3:
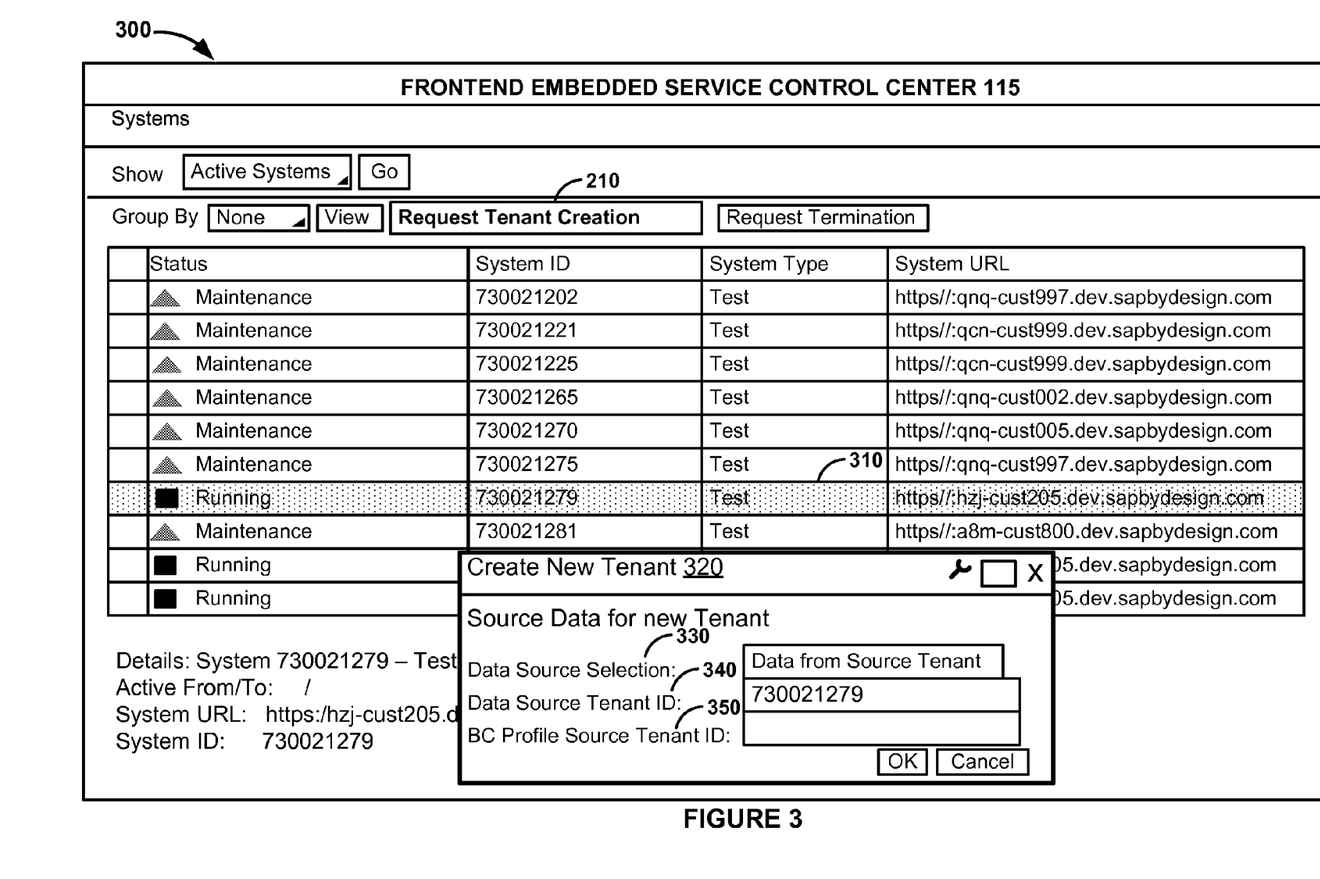
FIG. 3 is an exemplary screenshot illustrating creating a new tenant in the service control center, according to some embodiments.

FIG. 3 is an exemplary screenshot illustrating creating a new tenant in the service control center, according to some embodiments. Screenshot 300 may include other unshown elements according to some embodiments. Screenshot 300 illustrates a user interface from the frontend embedded service control center 115. Screenshot 300 illustrates Create New Tenant 320 window displayed from selecting Request Tenant Creation 210 feature. In some embodiments, the new tenant may be created without using any source data for another tenant. In that case, the new tenant has no application data and is created with an initial solution profile. Solution profile represents the configuration data of a tenant. In other embodiments, the new tenant may be created by using another available tenant's source data. For example, the user wants to create a test tenant that is a duplicate of a running productive tenant and includes same application data and solution profile. In this case, the user selects the source tenant (e.g., tenant 310) and then chooses Create New Tenant 320.

Create New Tenant 320 includes one or more fields about the source data for the new tenant. This data may be automatically filled in by the service control center 115 using the already selected tenant. For example, tenant 310 is selected by the user and its information is automatically filled in the Create New Tenant 320 window. Data Source Selection 330 specifies that the data used for the creation of the new tenant is coming from a source tenant. Data Source Tenant ID 340 specifies the system ID number of the source tenant. BC (business configuration) Profile Source Tenant ID 350 specifies the solution profile of the source tenant. Although the BC Profile Source Tenant ID 350 is not shown as filled in, it may also be automatically entered by the service control center 125.

In some embodiments, the user may create a new tenant with a particular solution profile (e.g., to use a given system configuration), but with no application data or with application data from another tenant. In Create New Tenant 320 window, the user may remove the automatically filled in data and enter the required information. Thus, the customer may choose from which source tenant the application data and the solution profile to be obtained and these source tenants may differ.

Determination of a new tenant may be based on source tenant type and status. When a new test tenant request is created, the selected productive tenant is proposed automatically as source for application data and solution profile. For a customer subsidiary scenario, a productive tenant template may be emulated. When a customer requests a new tenant, the request is parameterized by default in a way that enables creation of a productive tenant for the new subsidiary with the same configuration and the same level of data as for other subsidiaries.

In some embodiments, a productive tenant may only be ordered if a customer has no productive tenants or the customer has already created a decommissioning request for the productive tenant. In this way, it will be clear for the customer that the existing productive tenant will be removed and also that there may not be two productive tenants with lifecycle status "live" at the same time. For some business scenarios, this rule may not be applied as the customer mainly orders just one productive tenant. In other embodiments, the customer may have at most one customer test tenant at the same time. Before creating a tenant request, the system may check if the customer has already a test tenant or a test tenant provisioning request. In this case, no further creation is possible. For some products, the customers may order as many test tenants as they want, but they will be charged additionally for those extra tenants. When a customer creates a request for ordering a new test tenant, the customer invoicing system 185 is notified automatically. This product-specific behavior is subject of configuration in the central administration system (e.g., the service provider cockpit system 125).

Figure 4:
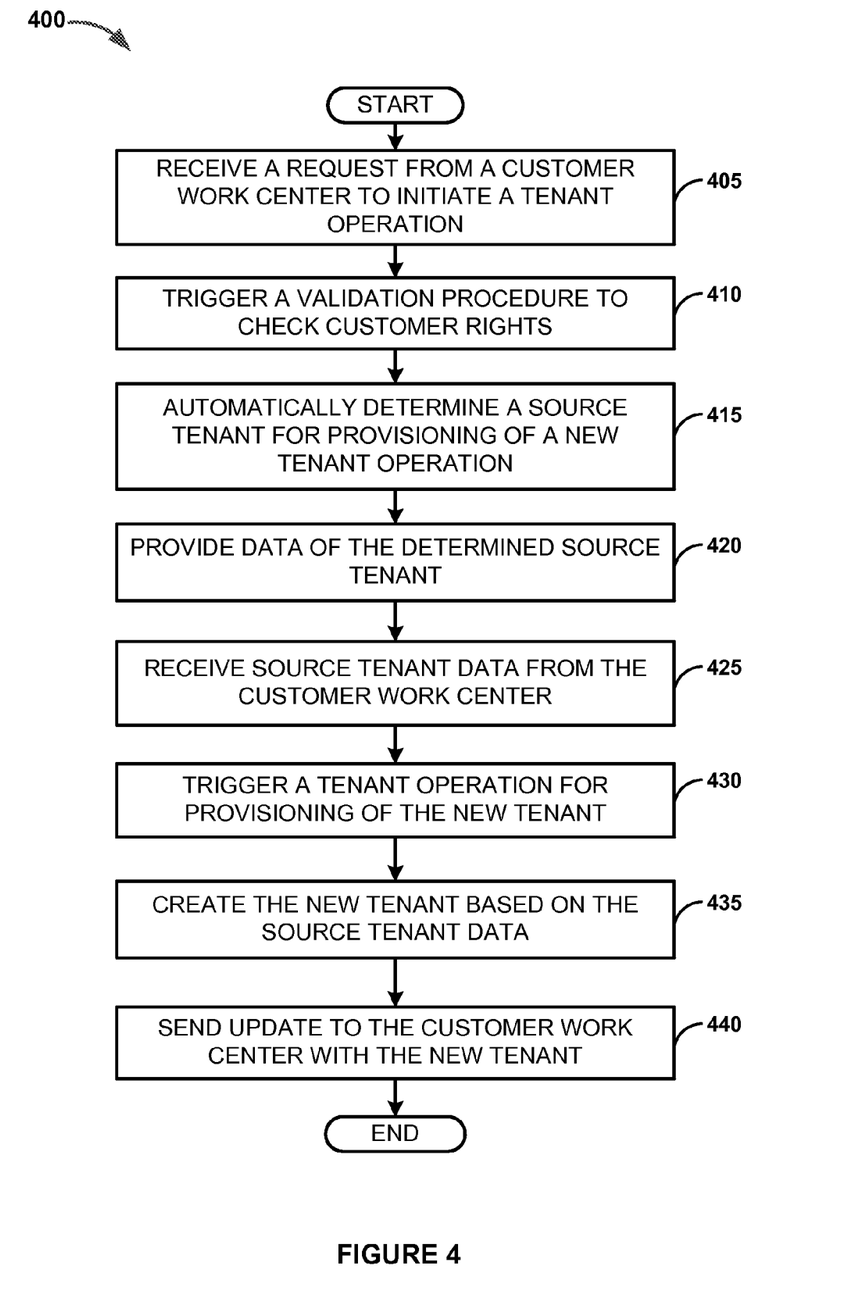
FIG. 4 is a flow diagram illustrating a process for performing customer initiated tenant operations, according to some embodiments.

FIG. 4 is a flow diagram illustrating process 400 to perform customer initiated tenant operations, according to some embodiments. In some embodiments, various hardware elements (e.g., processors) execute program code to perform process 400. Process 400 and other processes described herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 400 defines a procedure to perform customer initiated tenant operations in a service provider cockpit system of a cloud environment. In various embodiments, the customer initiated tenant operations are exposed and provisioned with a customer work center as part of a frontend cloud enterprise application.

At 405, a request is received from a customer work center of a frontend cloud enterprise application to initiate a tenant operation. The request is received at service provider cockpit system 125 (FIG. 1). The customer may initiate tenant operations on existing system tenants such as removing a system tenant or may initiate tenant operations to create a new system tenant with default application and configuration data or a system tenant with application and configuration data from a source tenant.

At 410, a validation procedure is triggered to check the customer rights to initiate the requested the tenant operation. In case of requesting a new system tenant to be created, the validation procedure checks the user rights of the customer for creating a new tenant. In various embodiments, the user permissions may be determined based on information collected from an SLA, the global invoicing and billing system, sales orders, and so on. In case of a requesting an existing system tenant to be terminated, the validation procedure checks if the current user has right to perform this operation. For example, not every user may be authorized to request to terminate a productive system tenant. The validation is performed by the tenant operation engine 160 (FIG. 1).

At 415, a source tenant is automatically determined for the provisioning of a new tenant operation. In some embodiments, if a test tenant is requested by the customer, an available productive tenant may be automatically determined as source tenant for the creation of the test tenant. In this way, the new test tenant will be created with application data and configuration data (solution profile) obtained from the productive tenant. In other embodiments, a selection of a source tenant from a list of available system tenants in the customer work center may be received. Based on that selection, the source tenant is determined.

At 420, data of the determined source tenant is provided via the work center for confirmation. The data may include information such as: 1) data source selection 330 (FIG. 3) that specifies the data used for the creation of the new tenant is coming from a source tenant; 2) data source tenant ID 340 that specifies the system ID number of the source tenant; and 3) business configuration profile source tenant ID 350 that specifies the solution profile of the source tenant. In some embodiments, the user may confirm the automatically determined source tenant without making any changes. In other embodiments, the use may decide to change one or more of the source tenant data. For example, the user may submit one source tenant for copying the application data and another source tenant for copying the configuration data of the solution profile. This means that the user may choose for a source tenant a test tenant, a productive tenant, or other tenant type from the list of available tenants displayed in the work center.

Back to FIG. 4, at 425, the source tenant data submitted by the user is received from the customer work center. At 430, a tenant operation for provisioning of a new tenant based on the received source tenant data is triggered. The tenant operation is triggered in the service provider cockpit system 125. Using the tenant operation engine, the triggered tenant operation is executed. At step 435, the new tenant is created based on the received source tenant data. Finally, the customer work center is updated with the new tenant, at step 440. The new tenant is displayed in the list of tenants.

Performing customer initiated tenant operations enables more flexibility in the implementation phase of a cloud enterprise application and leads to reduction of the total number of additional non-productive tenants. Although, the one-tenant approach may be valid for some scenarios, it may not be useful for other customers that require on-demand services. Some customers may run hybrid solutions with tight integration between on-demand and on-premise products. Therefore, those customers may prefer to start the implementation project of the application by having a test tenant, where the integration to the on-premise product is implemented and tested. After a successful test, the customers may order a new productive tenant discarding the initially provided productive tenant. In this way, customers are provided at the beginning of the implementation phase with a test tenant. Once the integration is successfully tested, the customer can request a productive tenant using the service control center capabilities.

In various embodiments, customers using cloud applications are enabled to coordinate and initiate tenant operations by the cloud application provider out of their enterprise application in a way that matches their needs. System supported tenant operations combined with automatic validations and determinations are exposed directly to the customer. Those operations offer the needed flexibility to the customers. This flexibility combined with system supported interaction simplicity and process consistency guarantees also the desired low TCO.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
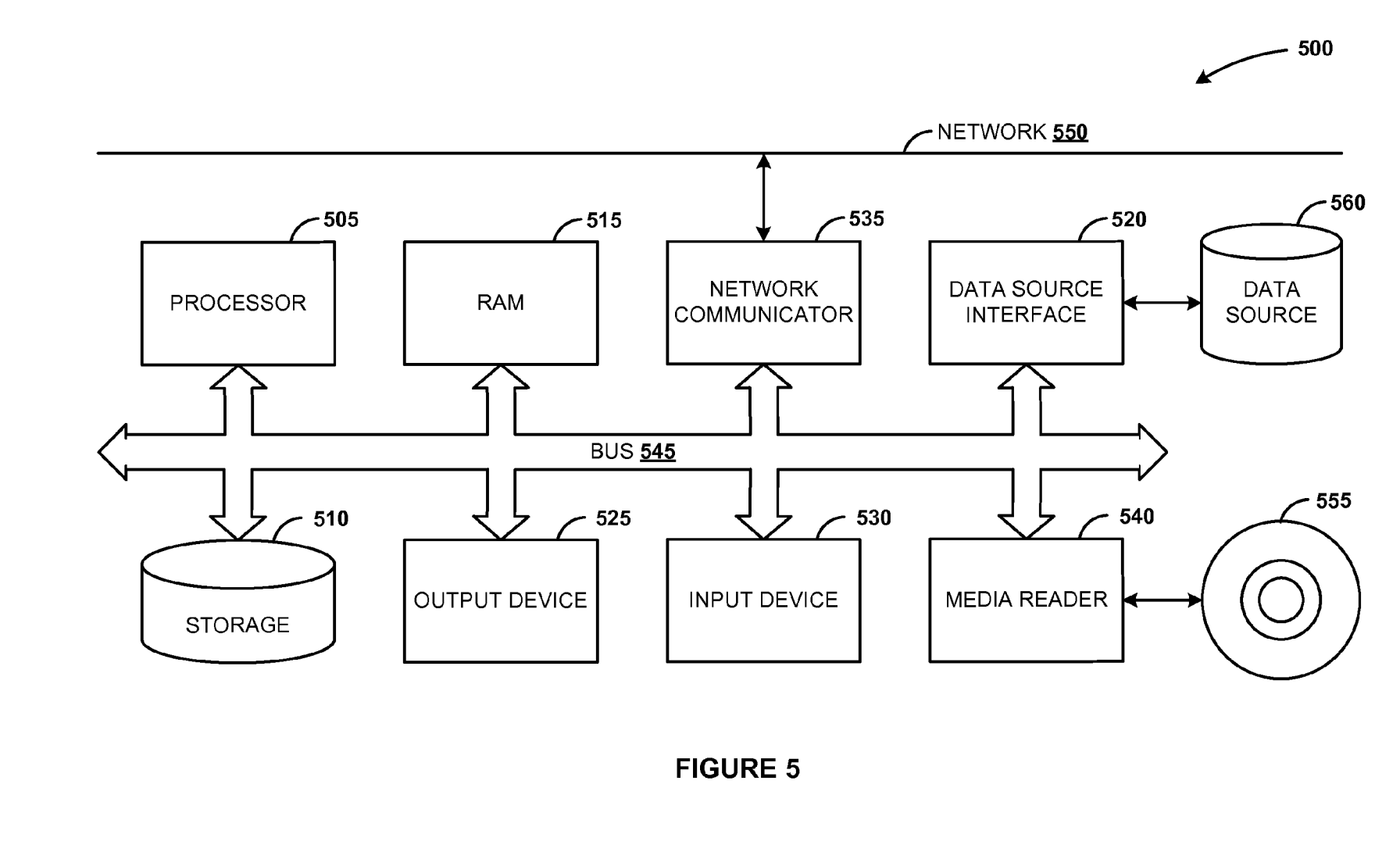
FIG. 5 is a block diagram of an exemplary computer system 500, according to some embodiments.

FIG. 5 is a block diagram of an exemplary computer system 500, according to some embodiments. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiment examples are described herein for illustrative purposes, various equivalent modifications are possible as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
   receiving a request to initiate a tenant operation from a work center of a cloud application, wherein the tenant operation includes provisioning of a new tenant;
   triggering a validation procedure to check permissions for executing the requested tenant operation;
   receiving source tenant data to be used for the provisioning of the new tenant via the requested tenant operation; and
   triggering the provisioning of the new tenant in a service provider cockpit system from the requested tenant operation based on the received source tenant data.

2. The method of claim 1, further comprising:
   creating the new tenant based on the received source tenant data; and
   sending an update to the work center of the cloud application with the created new tenant.

3. The method of claim 1, further comprising:
   automatically determining a source tenant for the provisioning of the new tenant by the service provider cockpit system; and
   automatically determining the source tenant for the provisioning of the new tenant by receiving a selection of the source tenant from the work center.

4. The method of claim 1, wherein receiving the source tenant data comprises:
   receiving a data source selection for the new tenant that specifies the source tenant for obtaining application data for the new tenant;
   receiving a data source tenant identifier; and
   receiving a solution profile source tenant identifier that specifies the source tenant for obtaining configuration data for the new tenant.

5. The method of claim 4, wherein the data source tenant identifier is different from the solution profile source tenant identifier.

6. The method of claim 1, wherein the validation procedure checks the permissions based on information collected from a global invoicing and billing system.

7. The method of claim 1, wherein the tenant operation includes a request to terminate an existing tenant.

8. A computer system providing bundle-to-bundle authentication in modular systems, comprising:
   a processor;
   a memory in communication with the processor, the memory storing instructions related to:
      a service provider cockpit system running on a cloud platform;
      a service control center backend engine to receive a request to initiate a tenant operation from a work center of a cloud application, wherein the tenant operation includes provisioning of a new tenant; and
      a tenant operations engine that triggers a validation procedure to check permissions for executing the requested tenant operation, determines source tenant data to be used for the provisioning of the new tenant, and creates the new tenant.

9. The computer system of claim 8, further comprising a tenant communications adapter that determines from which tenant and user the request was sent and which data can be accessible from the tenant and the user.

10. The computer system of claim 8, further comprising a tenant data collector that stores collects and stores replicated data.

11. The computer system of claim 8, further comprising a global invoicing and billing system that maintains data used in the validation procedure to check permissions for executing the requested tenant operation.

12. The computer system of claim 8, wherein the source tenant data comprises:
    a data source selection for the new tenant that specifies the source tenant for obtaining application data for the new tenant;
    a data source tenant identifier; and
    a solution profile source tenant identifier that specifies the source tenant for obtaining configuration data for the new tenant.

13. The system of claim 12, wherein the data source tenant identifier is different from the solution profile source tenant identifier.

14. A non-transitory computer-readable medium storing instructions, which when executed cause a computer system to:
    receive a request to initiate a tenant operation from a work center of a cloud application, wherein the tenant operation includes provisioning of a new tenant;
    trigger a validation procedure to check permissions for executing the requested tenant operation;
    receive source tenant data to be used for the provisioning of the new tenant via the requested tenant operation; and
    trigger the provisioning of the new tenant in a service provider cockpit system from the requested tenant operation based on the received source tenant data.

15. The computer-readable medium of claim 14, further comprising instructions that cause the computer system to:
    create the new tenant based on the received source tenant data; and
    send an update to the work center of the cloud application with the created new tenant.

16. The computer-readable medium of claim 14, further comprising instructions that cause the computer system to:
    automatically determine a source tenant for the provisioning of the new tenant by the service provider cockpit system; and
    automatically determine the source tenant for the provisioning of the new tenant by receiving a selection of the source tenant from the work center.

17. The computer-readable medium of claim 14, further comprising instructions that cause the computer system to:
    receive a data source selection for the new tenant that specifies the source tenant for obtaining application data for the new tenant;
    receive a data source tenant identifier; and
    receive a solution profile source tenant identifier that specifies the source tenant for obtaining configuration data for the new tenant.

18. The computer-readable medium of claim 17, wherein the data source tenant identifier is different from the solution profile source tenant identifier.

19. The computer-readable medium of claim 14, wherein the validation procedure checks the permissions based on information collected from a global invoicing and billing system.

20. The computer-readable medium of claim 14, wherein the tenant operation includes a request to terminate an existing tenant.

* * * * *